United States Patent [19]
Ohkawa

[11] 4,264,413
[45] Apr. 28, 1981

[54] METHOD AND APPARATUS FOR HIGH BETA DOUBLETS AND MULTIPLETS

[75] Inventor: Tihiro Ohkawa, La Jolla, Calif.

[73] Assignee: General Atomic Company, San Diego, Calif.

[21] Appl. No.: 753,172

[22] Filed: Dec. 22, 1976

[51] Int. Cl.² ............................................. G21B 1/00
[52] U.S. Cl. ........................................... 176/3; 176/1
[58] Field of Search .................... 176/1, 2, 3; 315/111.4–111.7

[56] References Cited

U.S. PATENT DOCUMENTS

| | | | |
|---|---|---|---|
| 3,607,627 | 9/1971 | Furth et al. | 176/3 |
| 3,692,626 | 9/1972 | Ohkawa | 176/3 |
| 3,801,438 | 4/1974 | Ohkawa | 176/3 |

OTHER PUBLICATIONS

UCRL-50002-75 CTR Annual Report 7/74-6-75, (10/15/75), pp. 77-78.
S 6158 0136y, Review of Sci. Ins., vol. 47, No. 6, pp. 735-737, 6/76, Inoue et al.

*Primary Examiner*—Samuel W. Engle
*Assistant Examiner*—S. A. Cangialosi
*Attorney, Agent, or Firm*—Fitch, Even, Tabin, Flannery & Welsh

[57] ABSTRACT

Method and apparatus for initially producing a sharp boundaried theta-pinch plasma, and subsequently relaxing the current sheath of the plasma to provide a diffuse-pinch plasma, in which the diffuse pinch plasma has a doublet or higher multiplet magnetic confinement configuration with one or more internal separatrices, and in which the initially formed, sharp-boundaried plasma is provided with a current sheath having a contour corresponding to a flux surface of the doublet or multiplet configuration.

9 Claims, 3 Drawing Figures

METHOD AND APPARATUS FOR HIGH BETA DOUBLETS AND MULTIPLETS

The present invention is directed to the production, control and confinement of plasma in systems involving a generally toroidal plasma configuration, and more particularly is directed to improvement of the ratio of thermal energy density to magnetic energy density of such systems.

Various devices have been developed for generating, confining, and studying plasmas, which are ionized gases comprising approximately equal numbers of positively charged ions and free electrons at high temperatures. If a plasma is formed from a suitable gas or mixture of gases, such as deuterium or tritium, fusion reactions may occur within the plasma. Such fusion reactions produce energetic charged particles and neutrons. If the proper conditions are realized the energy obtained from the fusion reactions may exceed the input energy and provide useful power, and certain of such plasma devices find utility in connection with the generation and study of plasma relative to the production of such reaction, or relative to other aspects of the study of the physics of plasmas, and the provision and confinement of very high temperature plasmas.

In order to provide hydrogen plasmas (including plasmas of hydrogen isotopes deuterium and/or tritium) for study or other utilization of high temperature plasma conditions, it is not only appropriate to confine the plasma in a given region at extremely high temperatures for an appreciable period of time, but also to exclude the plasma from contact with solid container walls. Consequently, a large number of inertial and magnetic and electrical field configurations, and apparatus for producing them, have been developed or proposed in connection with the confining of plasma.

One general type of device for plasma confinement comprises an endless, closed tube, such as a toroid, with a geometrically coextensive, externally imposed magnetic field, (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. Illustrative of such devices of the Tokamak configuration, and such "diffuse pinch" devices may be generally referred to hereinafter as Tokamak devices or systems. The toroidal configuration may be advantageously employed with plasmas and plasma confinement systems of noncircular cross-section, such as those involving plasma configurations which are axisymmetrically elongated in a direction parallel to the major toroidal axis. U.S. Pat. Nos. 3,692,626 entitled "Apparatus for Forming and Containing Plasma", and 3,801,438 entitled "Toroidal Apparatus for Confining Plasma" both to the present inventor, and both assigned to the assignee of the present invention, illustrate plasma confinement apparatus of the toroidal type having a noncircular cross-section in a plane parallel to and intercepting the major toroidal axis.

As indicated previously, Tokamak systems for the containment of high-temperature plasmas comprise means for providing a strong, toroidal magnetic field in which the plasma is to be embedded, and which is generally provided by electrical current in one or more conductive coils encircling the minor toroidal axis. In this connection, the term "axis" is used herein to include multiple axes or axial surfaces, such that reference to toroidal diffuse pinch systems includes those having a non-circular cross-section. Such systems also comprise means for providing a toroidal electric field to maintain a current flowing in the plasma, generally in the direction of the minor axis, and this plasma current in turn generates a magnetic field component which is poloidal (i.e., the magnetic flux lines are closed about the minor toroidal axis). The combination of the poloidal magnetic field produced by the plasma current, with the toroidal magnetic field produced by the conductive coil current may provide resultant helix-like magnetic field lines that generally lie on closed, nested magnetic surfaces. The plasma is accordingly subjected to confining, constricting forces generated, at least in part, by the current flowing in the plasma. In the diffuse-pinch design, the current is distributed throughout the cross-section of the plasma, which accordingly provides a diffuse poloidal magnetic field which is within, as well as encircling, the plasma. The resulting diffuse magnetic field provides for a diffused pinching force in the confining magnetic field substantially greater than the outward pressure of the plasma.

One measure of the confinement efficiency of plasma confinement systems is the ratio of thermal energy density of the plasma, to the energy density of the magnetic field in which the plasma is confined. This ratio is conventionally known as the beta ratio, $\beta$, and when this ratio is defined in toroidal systems with respect of the energy density of the poloidal magnetic field, it is known as the poloidal field beta ratio, $\beta_p$. It is generally known that a thermonuclear plasma confinement system should demonstrate high $\beta$ containment for economical power production. Conventional toroidal diffuse pinch Tokamak plasma confinement systems generally have a poloidal field beta ratio which is, generally, less than one. Substantial improvement in the beta ratios of diffuse pinch toroidal confinement plasma devices may be achieved by imposing specific magnetic boundary conditions in plasmas of non-circular cross-section, and in this connection, for example, the utilization of an axisymmetrically elongated plasma of doublet configuration may provide a beta value which is a factor of ten larger than in circular cross-section Tokamak devices. However, the beta values of even the elongated diffuse pinch plasma systems are relatively low in respect of confinement effectiveness, and further improvements in the beta ratios of toroidal plasma confinement systems would be desirable.

In this regard, the beta values of conventional Tokamak systems have probably not reached the limiting value dictated by magnetohydrodynamic considerations. Limiting values may instead be imposed by heating methods or transport rates. Furthermore, there are theoretical arguments that the transport rates at lower values of beta are much higher than those at higher beta values. Moreover, some plasma instabilities may become absent at large beta values, thereby providing for improved confinement effectiveness. Thus, provision of toroidal confinement systems with higher beta values could provide for a desirable decrease in transport rates which limit plasma energy confinement. The desirability of providing toroidal confinement systems with a high value of beta may be further indicated, in historical perspective, with reference to the development of mirror machine plasma confinement systems. In this connection, the approach of starting from a very low plasma density and low beta value in the so-called Baseball configuration (in which Joffe bars resemble the seams of a baseball) turned out to be very difficult (as reported in "Plasma Production and Confinement in the Baseball II Mirror Experiment" by O. A. Anderson et al, paper D-5-2 of the Proceedings of the 5th Conference on Plasma Physics and Controlled Nuclear Fusion Research, Tokyo, Japan, Nov. 11-15, 1974), while the relative success of the 2XII experiments has demonstrated the advantage of starting at a moderately high value of beta (as reported in "Plasma Containment in 2XII" by F. H. Coensgen et al., paper D-2-1 of the Proceedings of the 5th Conference on Plasma Physics and Controlled Nuclear Fusion Research, Tokyo, Japan, Nov. 11-15, 1974).

Also illustrative of the toroidal plasma confinement systems are the higher mass density systems known as toroidal theta pinch devices, in which an electrical current is provided in the theta, or azimuthal direction (around, or encircling, the minor toroidal axis). The resulting magnetic field is in the zeta, or axial direction (along, or in the same direction as, the minor toroidal axis). Conventional theta pinch devices tend to be fast-pulsed systems which have current flow around the plasma column within a thin surface layer of the plasma, producing a magnetic field which surrounds the plasma, but which does not provide magnetic flux lines within the plasma. These conditions provide for a "sharp" pinch in which the confining force is exerted generally from the conducting zone at the exterior surface of the plasma, rather than throughout the plasma as in "diffuse" pinch configurations. Conventional theta pinch devices have an advantage of being adapted for higher density plasma confinement at relatively high beta values ($\beta_p$ may be greater than 1) but have relatively poor magnetohydrodynamic stability.

Conceptually, the problem of providing toroidal plasma confinement configurations with a respectable $\beta$-value may be considered to be approachable from two extremes. One approach is to attempt to improve the $\beta$-value of conventional diffuse-pinch devices, which generally have a poloidal beta value less than 1.

At the other end of the spectrum is the approach by utilizing as a starting point a conventional theta pinch device configuration having a relatively high poloidal beta value of more than 1, and attempting to improve the magnetohydrodynamic stability by partial sacrifice of the high beta values. For various reasons, including the historical considerations previously referred to, if toroidal diffuse pinch plasma confinement systems are to eventually be developed with more respectable beta values, the latter approach should receive preferential consideration. The appropriate system would be capable of providing information as to the magnetohydrodynamic limits on the beta values. Moreover, as indicated previously, such a confinement system may avoid the anomalous transport associated with a low beta value. In addition, such an approach may provide a high density, short pulse type of confinement system.

However, an appropriate confinement system must satisfy the magnetohydrodynamic equilibrium and stability conditions throughout the discharge period, and conventional systems have not satisfied such conditions. In this connection, the Belt pinch experiment (reported in "The Belt Pinch II Experiment with Improved Shock Heating" by O. Gruber et al., Proceedings of the Seventh European Conference on Controlled Fusion and Plasma Physics (1975), Volume I, page 43) is an example of a noncircular plasma cross-section, high beta Tokamak system which fails in satisfying the magnetohydrodynamic conditions. In the Belt experiments, a toroidal plasma with an elongated cross-section was produced initially by a rapid pulse of toroidal magnetic field and toroidal electric field. As in the theta pinch configuration, this produces a plasma current which is on the surface. However, when the current sheath relaxes so that the plasma carries current throughout its cross-section as is characteristic of diffuse-pinch confinement, the plasma configuration becomes less elongated and the plasma hits the insulating wall near the median plane. No provision was made to keep the equilibrium with the same elongation independent of the current distribution. Moreover, the Belt confinement system fails to meet safety factor stability conditions; the initial theta pinch plasma configuration and the final diffuse-pinch configuration have quite different safety factor (q) profiles. The final configuration has the minimum value of q on the axis, while the initial configuration has the minimum value of q at the edge of the plasma. The transitory configurations as the current sheath relaxes, or diffuses, thus have the minimum of q in the body of the plasma. It is known that a plasma configuration with q-minimum within the plasma, at a location other than on the minor axis, is unstable.

In accordance with the present invention these shortcomings in respect of toroidal discharge systems employing a sharp pinch-diffuse pinch transition may be remedied so that a plasma configuration may stay stable throughout the discharge period.

It is a further object to provide toroidal plasma confinement systems having improved beta ratios of plasma energy to magnetic field confinement energy.

These and other objects will become apparent from the following description and the corresponding drawings, of which:

Generally, the present invention is directed to high beta toroidal plasma confinement systems, including methods and apparatus, in which a sharp boundaried toroidal plasma of noncircular cross-section with elongation in the direction of the major toroidal axis, is initially produced, which is subsequently transformed into a diffuse pinch toroidal plasma configuration of noncircular cross-section with elongation in the direction of the major toroidal axis. Throughout the transition from the initial (theta-pinch) sharp boundary condition, to the toroidal diffuse pinch boundary condition, the plasma configuration is maintained magnetohydrodynamically stable, as will be more fully explained hereinafter. Furthermore, the elongation of the plasma in the direction of the major toroidal axis is maintained relatively constant during the transition. These transition objectives are accomplished, at least in part, through the provision of internal separatrices in the confined plasma.

Generally, apparatus in accordance with the present invention may resemble the Belt pinch experiment apparatus described in the Gruber, et al. article, referred to hereinabove, which is incorporated herein by reference. In such apparatus, a pulsed toroidal magnetic field and electric field in a theta pinch confinement system produces and shock heats a plasma in a toroidal chamber with an elongated cross section. An important difference from the Gruber, et al. apparatus, however, is that the shape of the chamber and a conducting shell, or an appropriate set of coils and current source, are employed to produce a doublet or higher multiplet-shaped plasma having internal separatrices. If a conducting shell is used, the device may resemble the Doublet I apparatus or Doublet II apparatus of General Atomic Company in this regard, except that the toroidal magnetic field is pulsed around the minor axis as in theta-pinch apparatus. The power supplies of the system will generally be more like those of a conventional theta-pinch apparatus than those of a conventional Tokamak system. In one embodiment, the shape of a conducting shell surrounding the plasma is designed in such a way that (1) the poloidal field distribution during the transition changes as little as possible, and (2) the minimum safety factor q-value minimum will be maintained at the edge of the plasma during the transition from the sharp boundary of the diffuse pinch condition. A doublet shape with two internal separatrices is adequate for an elongation of up to about 3. A plasma configuration having larger elongation ratio would desirably employ a triplet or a higher multiplet configuration having additional separatrices.

Figure 1:
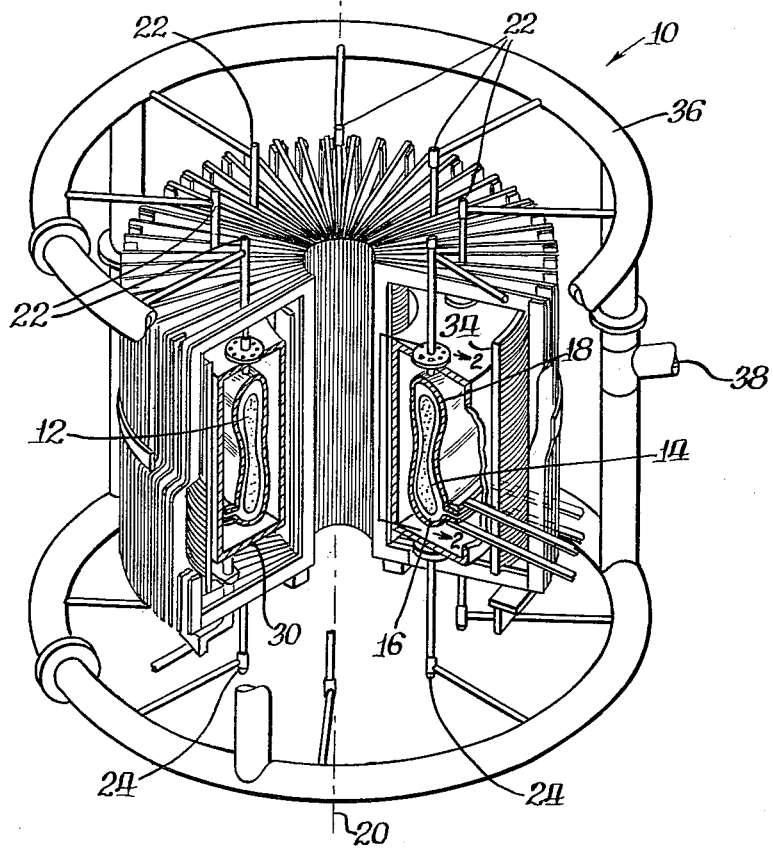
FIG. 1 is a perspective view, partially broken away, of a toroidal plasma confinement system illustrating an embodiment of the present invention.
Figure 2:
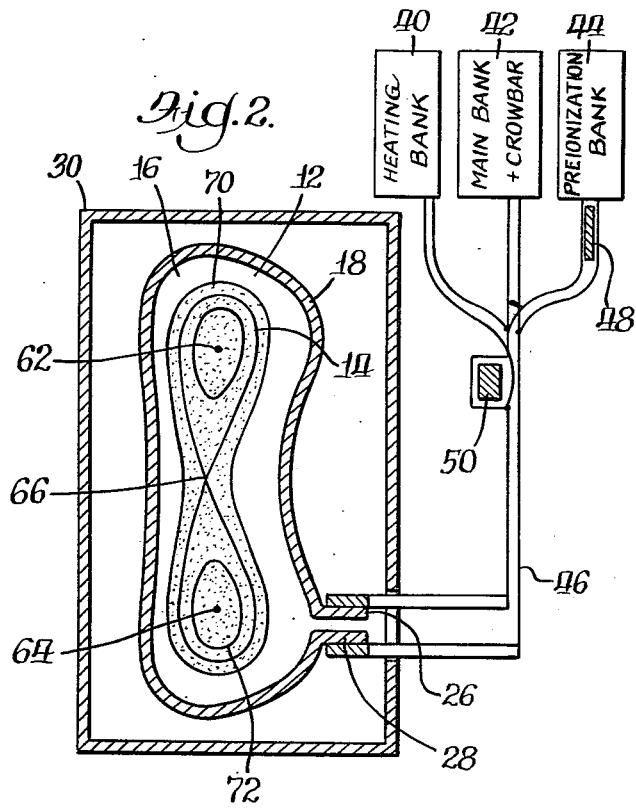
FIG. 2 is a partial cross-section view taken through line 2—2 of the plasma chamber of the toroidal plasma confinement system of FIG. 1.

The invention will now be more particularly described with specific reference to the toroidal plasma confinement system illustrated in FIGS. 1 and 2 of the drawings.

Illustrated in FIG. 1 is a toroidal plasma confinement apparatus 10 which is adapted for providing a plasma 12 of noncircular cross-section. The boundary 14 of the plasma 12 is schematically represented by a closed, equidensity surface, in terms of mass density, which encloses substantially all of the plasma (e.g., 95% or more of the plasma mass). The plasma 12 is contained in a toroidal zone 16 which is defined by the toroidal conducting shell 18 which is generally radially symmetrical about the longitudinal major toroidal axis 20 of the apparatus 10. The conducting shell 18 is of a doublet shape adapted to establish magnetic boundary conditions of the doublet separatrix type, as will be more fully described hereinafter, and is provided with access ports for vacuum and gas supply. The interior walls of the toroidal shell 18 may be protected by a liner (not shown) fabricated of graphite, silicon carbide, or some other suitable low atomic number material which minimizes the impurity effects of wall material sputtered back into the plasma as a result of charged particle bombardment of the liner.

The conducting shell is fabricated of a metal such as copper, and is generally in the form of a sheet extending around the minor axis and toroidal zone 16. The conducting shell is continuous in a rotational direction about the major axis 20, but is not electrically continuous about the minor axis, terminating at outwardly projecting terminal rims 26, 28 in the illustrated embodiment. It will be appreciated that in operation of the plasma apparatus 10, a current is pulsed around the conducting shell, and accordingly around the minor axis of the plasma, as will be more fully described hereinafter.

External of the shell 18 is the vacuum chamber 30 which is made of an electrically insulating material which may have a thin metallic coating to avoid an excessive amount of impurities. The vacuum chamber is hermetically sealed, and is provided with conduit 32 as an access port.

Externally of the vacuum chamber 30 is an additional set of magnet coils 34 which may be driven by a capacitor bank. These coils 34 are electric field induction coils which function to ionize the plasma 12 and induce a plasma current. A radially symmetrical manifold array 36, which may be connected to a vacuum system (not shown) via outlet ports and piping 38, communicates with the interior of the vacuum chamber 30 by means of access ports 22, 24 and the associated piping.

As indicated previously, electrical current is pulsed through the conducting shell 18, and this current may be provided by suitable capacitor banks which are shown (schematically) in FIG. 2. FIG. 2 is a partial cross-sectional view taken through line 2—2 of the plasma chamber of the apparatus of FIG. 1, and bears the same reference numerals for various elements of the chamber system as those shown in FIG. 1. FIG. 2 also schematically shows the power system for the plasma chamber, and in this regard, the terminal rims 26, 28 for the conducting shell 18 may be connected to a heating capacitor bank 40, a main capacitor bank 42, and a pre-ionization bank 44 as indicated in FIG. 2 by transmission line 46. The transmission line 46 may be magnetized through use of an iron core 48, so that the preionization bank 44 is decoupled from the main bank 42. In operation, the preionization bank is fired first, to provide an ionized plasma followed by the firing of the heating bank and main bank as indicated in the previously referred to Belt Pinch II experiments.

A transformer core 50 may be adapted to be saturated in such a way that complete flux reversal by the heating capacitor bank 40 is possible. When the main bank 42 and the heating bank 40 are fired, the sum of both voltages is supplied to the circuit. The energy content of the heating bank 40 and the iron core 48 cross-section may be chosen so that the first plasma compression resulting from the discharge of the heating bank 40 and the main bank 42, and the following ringing is in resonance with the bouncing plasma at a predetermined density range. After a final saturation produced by the main bank 42 the heating bank 40 may be decoupled from the main circuit and the toroidal field may be kept constant by the crowbar system of the main bank 42, or by toroidal magnetic field coils 52 encircling the vacuum chamber 30 and supplied by a dc power source such as a lead-acid battery system.

As indicated previously, the plasma confinement system must satisfy magnetohydrodynamic equilibrium and stability conditions throughout the discharge period. The equilibrium considerations of the toroidal confined plasma such as plasma 12 of the confinement apparatus 10 will now be discussed.

In this connection, an axisymmetric toroidal configuration with an arbitrary cross-section may initially be considered. For simplicity, a plasma confinement system in which the magnetic boundary conditions are determined by a conductor shell such as the shell 18 of the embodiment of FIGS. 1 and 2 will also be considered initially. The results will essentially be the same if current-carrying coils are used instead of a conductor shell to establish a doublet or multiplet plasma configuration, as will be described hereinafter with regard to the embodiment illustrated in FIG. 3.

When a toroidal magnetic field and a toroidal electric field are applied to a plasma chamber, a toroidal plasma with a surface current is produced. There is a vacuum volume zone established between the plasma and the conducting shell for a limiter or an insulating wall, such as the zone 60 between the conducting shell 18 and the plasma boundary 14 as shown in FIG. 1. A bias toroidal magnetic field may be used to control the beta-value of the plasma, and such a field may be provided by toroidal field coils 52.

The sharp boundary equilibrium condition initially resulting from the theta-pulsed current in a conduction shell such as the shell 18 requires that the total pressure is equal inside and outside of the plasma, i.e., $$\frac{B_{ti}^2}{2u_o} + p = \frac{B_{to}^2}{2u_o} + \frac{B_{po}^2}{2u_o} \quad (1)$$

where $B_{ti}$ and $B_{to}$ are the toroidal magnetic field inside and outside the plasma, p is the plasma pressure, and $B_{po}$ is the poloidal magnetic field. Since the toroidal field is proportional to $R^{-1}$, where R is the major radius, Equation (1) determines the radial dependence of $B_p$. Assuming the condition that the poloidal field does not vanish, the familiar limit on $\beta_p \equiv 2\mu_o p/<B_p>^2$ is obtained, i.e., $\beta_p \leq R/\Delta R$ is the plasma half width.

The safety factor q may be given by the following relationships:

$$q = \int \frac{B_{to}}{2\pi R B_{po}} ds \quad (2)$$
$$\approx \frac{L<B_{to}>}{2\pi <RB_{po}>}$$

where ds is the poloidal line element, and L is the poloidal circumference and the brackets < > denote an averaged quantity in this case the outside toroidal field over the internal from the plasma surface to the conducting shell. The toroidal field beta value, $\beta_t \equiv 2\mu_o p/<B_{to}>^2$ may be related with the poloidal beta value, $\beta_p$, through the relationship $\beta_t = \beta_p q^{-2}(L/2\pi R)^2$.

The apparatus 10 of FIG. 1 produces a plasma which is vertically elongated, in the major axial direction. For such a vertically elongated plasma, the average, meaning averaged over the major radius, poloidal field is constant around the poloidal circumference because of the initial sharp boundary condition of the theta pinch-like discharge. Therefore the average distance between the plasma and the conducting wall will be nearly constant around the poloidal circumference if the distance is small compared with the radius of the curvature of the cross-sectional shape. Accordingly, the shape of the plasma, such as the plasma 12, closely resembles the shape of the conducting shell, except for the toroidal shift of the radial position. This condition of conformity of the sharp plasma boundary during the initial discharge to the shape of the conductor shell is an important property as will be seen in the subsequent discussion.

The sharp sheath boundary condition initially formed, such as by the discharge of the heating bank 40 and the main bank 42 through the conducting shell 18, is subsequently relaxed to a diffuse pinch configuration. Under conditions in which the current sheath is relaxed with a uniform current configuration in the same conducting shell, such as provided in the shell 18 upon decoupling the heating bank 40 from the main circuit, the magnetohydrodynamic conditions may be qualitatively considered in the following manner. The magnetohydrodynamic equilibrium requires that the average poloidal field is larger near the median plane of the plasma than near the top and bottom tips of the plasma in directions along the major axis. This means that the distance between the outermost plasma flux surface and the conducting shell is much larger near the tips than near the median plane. In other words, the elongation of plasma becomes smaller than that of the conducting shell. Therefore, when the plasma makes a transition from the sharp boundary current condition, to a diffused current distribution condition, the plasma elongation decreases. If the plasma tends to retain the original volume, a substantial fraction of the plasma will be lost to the walls or limiter (if employed) during the transition. The resultant impurity influx would probably cool the plasma.

However, in accordance with the present invention, the elongation of the plasma may be kept roughly constant during the transition, because a configuration with a diffused current distribution is provided which has the poloidal field distribution around the poloidal circumference similar to the initial, sharp boundary configuration. This is accomplished by providing for a doublet or multiplet plasma configuration having internal separatrices. This point becomes apparent if one compares elliptic, doublet, and droplet plasma configurations. Various aspects relating to the doublet configuration are discussed in an article by the present inventor entitled "Multiple Configurations with Plasma Current", Kakuyugo-Kenkyu 20, No. 6, p. 557 (1968). The doublet and droplet configurations are also discussed in a paper by T. H. Jenson and others including the present inventor, entitled "Doublet II Experiment", Proceedings of 5th European Conference on Controlled Fusion and Plasma Physics, Grenoble, France, Volume I, p. 4 (1972). Both of these papers are incorporated herein by reference. In an elliptic configuration of a diffused current distribution, the poloidal field is weaker near the tips. On the other hand, in a droplet configuration, the poloidal field is weaker near the median plane. A doublet, or multiplet configuration has the least difference in poloidal field strength around the poloidal circumference. If the initial configuration has a very large elongation, such as indicated by a length (parallel to the major axis) to width ratio (along a radius perpendicular to the major axis) of about 3 or more, a triplet or higher multiplet configuration may be necessary.

The above consideration indicates that when a conducting shell is employed, the conducting shell should have a doublet or a multiplet shape as shown in FIGS. 1 and 2. Because the shape of the sharp boundaried plasma generally conforms to the shape of a conducting shell, as discussed previously, the initial plasma configuration has a doublet or multiplet shape with sharp current boundary, and without a separatrix. As the current sheath diffuses, a diffused current doublet or multiplet condition will be established without changing the elongation significantly.

As indicated, in accordance with the present invention, the plasma configuration is also kept magnetohydrodynamically stable throughout the transition from the sharp boundaried condition to the diffuse current distribution condition. A qualitative discussion of the provision of such stability is as follows:

The safety factor, q, for the initial, sharp boundary, theta-pinch configuration is infinite inside the plasma. It decreases across the thin current sheath and has the minimum value just at the outside edge of the current sheath. In the vacuum region between the conducting shell wall and the current sheath, it increases again. This type of profile is apparently stable within a reasonable value of q (q~3) and $\beta$, except for possible localized modes.

A stable toroidal (diffused-pinch) configuration has a profile quite different from the initial sharp boundaried plasma condition. The q-value has a minimum value on the minor axis and monotonically increases outwards. The configuration is stable within specific q and $\beta$ limits. Accordingly, it can be seen that if the initial sharp boundaried condition is a conventional elliptic plasma and the transition is to an elliptic tokamak configuration upon relaxation of the current sheath, it seems difficult to avoid having a minimum q-value in the plasma at some stage. It is well known that configurations with a minimum q within the plasma other than on the axis are unstable.

The q-profile of a toroidal doublet diffuse current plasma configuration such as shown in FIG. 2 is more compatible with the q-profile of the initial configuration. The q-value has the minimum on the elliptic axes 62, 64 and increases to infinity on the separatrix 66. Outside the separatrix the q-value decreases first. After going through a minimum value at the shearless surface it increases again. Thus the outer part of the q-profile resembles that of the initial configuration. In the transition, the separatrix will be created long before the current distribution becomes uniform and a tokamak-like q-profile will be started inside the separatrix. In principle, it is possible to make the transition without having a minimum of q-value in the plasma through the provision of a doublet or multiplet configuration in accordance with the present invention.

The $\beta$-value of the configuration can be controlled by choosing an appropriate value for the bias field. It should be chosen so that the $\beta$-value does not exceed the limiting values for stability at any stage of the discharge. In the embodiment of FIG. 1, the toroidal doublet magnetic field configuration is provided through the use of the appropriately shaped conducting shell 18 which can be seen from the cross-sectional illustration of FIG. 2.

The contour of a conducting shell which acts as a field shaper to provide a doublet, or higher multiplet magnetic field configuration, is provided with an axially elongated cross section with a relatively reduce thickness at the midplane and increased thickness at the axial tips. The shell may be generally shaped in accordance with the following principles. The density of the toroidal plasma current flowing in the diffused-pinch mode may be assumed to be proportional to the reciprocal of the major radius. A quadruple and an octopole field may be superposed on the magnetic field produced by this current. Then a flux function $\psi$ may be given, as follows:

$$\phi = -\frac{\mu_0 J_0 R_0^3}{4}\left[\left(\frac{R}{R_o}\right)^2 \ln\left(\frac{R}{R_o}\right) - \frac{1}{2}\left(\frac{R}{R_o}\right)^3 + \frac{1}{2} + \left(\frac{z}{R_o}\right)^2\right] + a_2\left[\left(\frac{R}{R_o}\right)^2 \ln\left(\frac{R}{R_o}\right) - \frac{1}{2}\left(\frac{R}{R_o}\right)^2 + \frac{1}{2} - \left(\frac{z}{R_o}\right)^2\right] +$$

-continued
$$a_4\left[24\left\{-\frac{1}{16}\left(\frac{R}{R_o}\right)^4 \ln\left(\frac{R}{R_o}\right) - \frac{5}{64}\left(\frac{R}{R_o}\right)^4 + \frac{1}{2}\left(\frac{R}{R_o}\right)^2 \ln\left(\frac{R}{R_o}\right) + \frac{1}{16}\left(\frac{R}{R_o}\right)^2 + \frac{1}{64}\right\} - 12\left(\frac{z}{R_o}\right)^2\left\{\frac{1}{2}\left(\frac{R}{R_o}\right)^2 \ln\left(\frac{R}{R_o}\right) - \frac{1}{4}\left(\frac{R}{R_o}\right)^2 + \frac{1}{4}\right\} + \left(\frac{z}{R_o}\right)^4\right]$$

where $J_o$ is the density of the toroidal plasma current at the major radius $R_o$, R is the radius measured from the major axis, and z is the distance from the median plane. The ratio of $a_2$ to $a_4$ may be chosen to give about equal amounts of the poloidal magnetic flux inside the separatrix 66 and between the separatrix 66 and the shearless surface. A flux surface well inside the shearless surface may be chosen to be the general pattern for defining the contour of the conducting shell. The rotational transform angle is largest at the elliptic magnetic axes and vanishes on the separatrix 66. It increases away from the separatrix 66 until it reaches a maximum on the shearless surface.

When the conducting shell contour generally has the shape of a doublet flux surface, the current sheath of the initially formed sharp-pinch plasma configuration, which initially conforms to the shape of the shell (albeit interiorly of the shell) will also approximately have the shape of a doublet flux surface outside of the separatrix. As the current sheath subsequently relaxes, the doublet plasma shape is maintained, and the doublet field is established in the final diffuse-pinch configuration.

The shape of the conducting shell may be skewed somewhat by flattening of the inside (with respect to the major toroidal axis) surface of the shell as indicated in FIG. 2.

A typical magnetic field configuration is shown in FIG. 2 in which a conducting shell 18 provides the magnetic boundary condition. The lines e.g. 70, 72 illustrate magnetic flux surfaces, and in the illustrated diffused-pinch mode equilibrium, the plasma pressure is balanced entirely by the poloidal magnetic field. The illustrated doublet configuration has three magnetic axes, namely, hyperbolic axis at the separatrix 66 and the two elliptic axes 62, 64.

Figure 3:
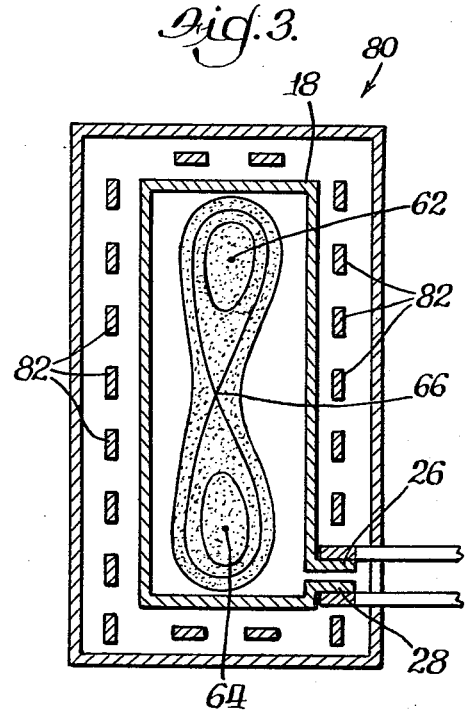
FIG. 3 is a cross-sectional view of a plasma chamber similar to that of FIG. 2, illustrating another embodiment of the present invention.

As indicated previously, the doublet or multiplet magnetic field configuration need not be provided solely by a suitably shaped conducting shell. Illustrated in FIG. 3 is a schematic cross-section of an embodiment 80 analogous to the embodiment illustrated in FIG. 2 which provides a doublet configuration through the use of field shaping coils 82 which are aligned generally parallel to the minor axis. By control of current passed through the coils, the magnetic field conditions of the plasma zone may be shaped to conform to that of FIG. 2, to provide a doublet or multiplet configuration in a manner known in connection with the Doublet II and Doublet III diffuse plasma current devices of General Atomic Company.

Accordingly, it will be appreciated that through the present invention, a method and apparatus is provided employing an initial, pulsed, sharp-pinch plasma configuration which is readily transformed to a diffused pinch configuration under magnetohydrodynamically stable conditions.

While the present invention has been particularly described in connection with the illustrated embodiments of FIGS. 1-3, it will be appreciated that other embodiments may be utilized. Various modifications and adaptations of the present invention will be apparent to those skilled in the art and are considered to be within the spirit and scope of the present invention.

Apparatus and methods in accordance with the present invention have particular utility in the study and analysis of the properties and behavior of plasmas, and in particular, the study and analysis of plasmas which are magnetically confined at relatively high beta ratios. The illustrated embodiment is particularly adapted for use in the generation, confinement, study and analysis of hydrogen plasmas (i.e., hydrogen, deuterium, tritium and mixtures thereof such as deuterium-tritium mixtures) at high temperature and high beta ratio magnetic confinement conditions, although the invention may also be used in the production of plasmas containing highly stripped elements of higher atomic number. Accordingly, the methods and apparatus of the present invention find utility as analytical techniques and instrumentation in respect of matter in the plasma state. In this connection, the apparatus may be provided with conventional diagnostic and measurement elements including magnetic probes, inductive pickup loops, particle detectors, photographic and spectrographic systems, microwave and infrared detection systems and other appropriate elements, the data outputs of which may be utilized directly or recorded, such as by transient data recorders.

Furthermore, various aspects of the present methods and apparatus may find utility as, or in the design or development of, fusion, systems, which of course, need not necessarily be net power producers in order to be utilizable as neutron or other particle or fusion product generators, isotope generators or transmuters, etc.

Various of the features of the present invention are set forth in the following claims:

What is claimed is:

1. In a method for producing and confining a toroidal plasma having a cross-section elongated in the direction of the major toroidal axis, comprising the steps of
   pulsing electrical current around the poloidal circumference of a plasma confinement zone and initially producing a sharp-boundaried, toroidal, theta-pinch plasma having plasma current flow substantially limited to a current sheath at the surface of the toroidal plasma to generate a toroidal magnetic field component which is substantially absent from the plasma interiorly of the current sheath whereby an electromagnetic confining force is exerted on the plasma from the plasma surface, and
   subsequently relaxing said current sheath of the plasma while maintaining the plasma in a toroidal magnetic field to provide a toroidal diffuse-pinch plasma in which the plasma current is distributed over the cross-section of the plasma to generate a diffuse poloidal magnetic field component distributed throughout the plasma,
the improvement comprising the steps of
providing said diffuse-pinch plasma with a doublet or higher multiplet magnetic confinement configuration having one or more internal separatrices, and providing said initially formed, sharp-boundaried plasma with a current sheath having a contour corresponding to a flux surface of said doublet or higher multiplet diffuse pinch configuration.

2. A method in accordance with claim 1 wherein said plasma is a plasma selected from the group consisting of hydrogen plasmas, deuterium plasmas, tritium plasmas, and mixtures thereof.

3. A method in accordance with claim 1 wherein the plasma has an elongation ratio of at least three, and wherein a higher multiplet magnetic confinement configuration is employed having more than two internal separatrices.

4. A method in accordance with claim 1 wherein said doublet or multiplet configuration is provided through the use of a toroidal conducting shell surrounding said plasma confinement zone and having a doublet or higher multiplet contour.

5. A method in accordance with claim 1 wherein said doublet or multiplet magnetic confinement configuration is provided at least in part by conducting current through field shaping coils oriented parallel to the minor toroidal axis to provide a magnetic field component which combines with the toroidal and poloidal plasma field components to provide a doublet or higher multiplet field.

6. In an apparatus for producing and maintaining a toroidal plasma having a cross-section elongated in the direction of the major toroidal axis, comprising,
   means for producing a toroidal, sharp-boundaried theta-pinch plasma in a toroidal plasma confinement zone having a current sheath at the outside surface of the plasma, and
   means for relaxing the current sheath of the sharp-boundaried plasma while maintaining a toroidal magnetic field in the plasma confinement zone to produce a toroidal diffuse-pinch plasma with a poloidal magnetic field distributed throughout the plasma, the improvement comprising
   means for providing said diffuse plasma with a doublet or higher multiplet magnetic confinement configuration having one or more internal separatrices, and means for shaping the current sheath of said initially formed sharp-boundaried plasma to conform to a flux surface of said doublet or higher multiplet magnetic confinement configuration.

7. Apparatus in accordance with claim 6 wherein said doublet or higher multiplet magnetic confinement means comprises a conducting shell having a doublet or higher multiplet flux surface contour, and wherein said current sheath shaping means comprises said conducting shell and means for pulsing electrical current around said shell.

8. Apparatus in accordance with claim 6 wherein said doublet or higher multiplet magnetic confinement means comprises magnetic field generating coils oriented parallel to the minor toroidal axis, and means for selectively energizing said coils to provide a magnetic field in said confinement zone having one or more internal separatrices.

9. Apparatus in accordance with claim 6 further comprising toroidal field generating coils encircling the minor toroidal axis and electrical current supply means for said coils to control the $\beta$ ratio of the confined plasma.

* * * * *